United States Patent
Yu et al.

(10) Patent No.: US 12,084,748 B2
(45) Date of Patent: Sep. 10, 2024

(54) NICKEL-BASED SUPERALLOY STEEL AND PREPARATION METHOD THEREOF

(71) Applicant: Zhejiang Dalong Alloy Steel Co., LTD, Jiaxing (CN)

(72) Inventors: Rongxin Yu, Jiaxing (CN); Yuwei Zu, Jiaxing (CN)

(73) Assignee: Zhejiang Dalong New Materials Co., Ltd., Jiaxing (CN)

(*) Notice: Subject to any disclaimer, the term of this patent is extended or adjusted under 35 U.S.C. 154(b) by 0 days.

(21) Appl. No.: 18/071,197

(22) Filed: Nov. 29, 2022

(65) Prior Publication Data
US 2023/0265547 A1 Aug. 24, 2023

(30) Foreign Application Priority Data
Dec. 6, 2021 (CN) .......... 202111477288.8

(51) Int. Cl.
| | |
|---|---|
| C22C 30/02 | (2006.01) |
| C21C 5/52 | (2006.01) |
| C21C 7/10 | (2006.01) |
| C21D 6/00 | (2006.01) |
| C22C 1/02 | (2006.01) |
| C22C 33/04 | (2006.01) |
| C22C 38/40 | (2006.01) |

(52) U.S. Cl.
CPC .......... C22C 30/02 (2013.01); C21C 5/5217 (2013.01); C21C 7/10 (2013.01); C21D 6/004 (2013.01); C22C 1/02 (2013.01); C22C 33/04 (2013.01); C22C 38/40 (2013.01)

(58) Field of Classification Search
CPC .................................................. C22C 30/02
See application file for complete search history.

(56) References Cited

U.S. PATENT DOCUMENTS 11,780,010 B2 * 10/2023 Cappuccini .......... B22F 5/009
419/31

FOREIGN PATENT DOCUMENTS

| CN | 102912222 A | 2/2013 |
| CN | 109967674 A | 7/2019 |

OTHER PUBLICATIONS

CN109967674A machine translation of Chinese language document dated Jul. 5, 2019.*

(Continued)

*Primary Examiner* — Christopher S Kessler
(74) *Attorney, Agent, or Firm* — Harness, Dickey & Pierce, P.L.C.

(57) ABSTRACT

The present disclosure belongs to the technical field of alloy preparation and provides a nickel-based superalloy and a preparation method thereof. In the present disclosure, the nickel-based superalloy includes the following components by mass percentage: C: 0.07% to 0.10%, 0<Si≤1.00%, 0<Mn≤1.50%, P≤0.020%, S≤0.005%, Cr: 19.0% to 23.0%, Ni: 31.0% to 34.5%, 0<Cu≤0.75%, Al: 0.15% to 0.60%, Ti: 0.15% to 0.60%, and Fe as a balance. In terms of mass percentage, Ni is adjusted to 31.0% to 34.5%, while P is controlled at less than or equal to 0.020% and S is controlled at less than or equal to 0.005%, thereby improving mechanical properties. The examples show that the nickel-based superalloy has a tensile strength of greater than or equal to 460 MPa, a specified plastic elongation strength of greater than or equal to 180 MPa, and an elongation at break of greater than or equal to 35%.

14 Claims, 1 Drawing Sheet

(56) References Cited

OTHER PUBLICATIONS

"Steel Melt Processing," Casting, vol. 15, ASM Handbook, Edited By Srinath Viswanathan, Diran Apelian, Raymond J. Donahue, Babu DasGupta, Michael Gywn, John L. Jorstad, Raymond W. Monroe, Mahi Sahoo, Thomas E. Prucha, Daniel Twarog, ASM International, 2008, p. 206-229, https://doi.org/10.31399/asm.hb.v15.a0005199.*

Incoloy® alloy 800H & 800HT®, available from www.specialmetals.com, Sep. 2004.*

Office Action regarding Chinese Patent Application No. 2021114772888, dated Apr. 13, 2022.

Office Action regarding Chinese Patent Application No. 2021114772888, dated May 25, 2022.

* cited by examiner

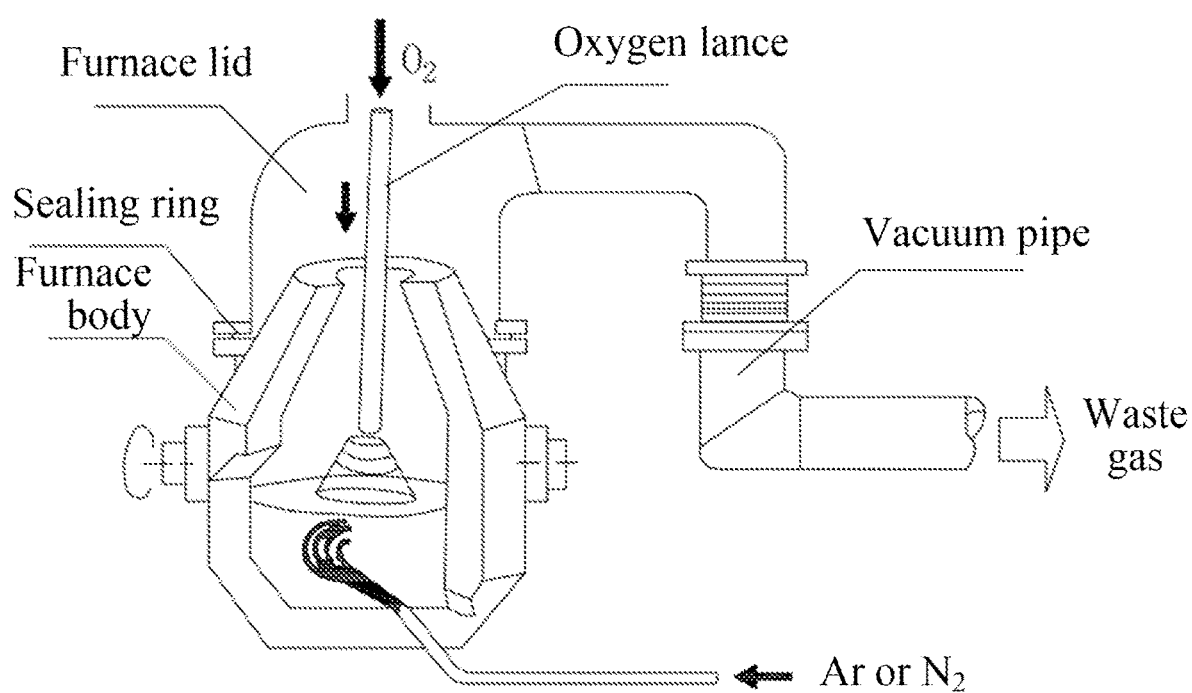

NICKEL-BASED SUPERALLOY STEEL AND PREPARATION METHOD THEREOF

CROSS-REFERENCE TO RELATED APPLICATIONS

This patent application claims the benefit and priority of Chinese Patent Application No. 202111477288.8, filed with the China National Intellectual Property Administration on Dec. 6, 2021, the disclosure of which is incorporated by reference herein in its entirety as part of the present application.

FIELD

The present disclosure relates to the technical field of alloy smelting, in particular to a nickel-based superalloy and a preparation method thereof.

BACKGROUND

This section provides background information related to the present disclosure which is not necessarily prior art.

The steel for solar monocrystalline silicon reactor mainly refers to a material suitable for the manufacture of basic structures for supporting the reactor, such as auxiliary chambers, furnace lids, furnace tubes, and pipelines of the monocrystalline silicon reactor. The production of silicon single crystal has a high temperature, such that it is necessary to prevent volatilization of the material of a single crystal furnace chamber shell from affecting the purity of a silicon single crystal; in addition, an interlayer of the single crystal furnace chamber shell needs to be cooled by cooling water, and it is also necessary to prevent corrosion of the single crystal furnace chamber shell by the cooling water. Austenitic stainless steel has excellent corrosion resistance, plasticity, high-temperature resistance, and weldability, and has low outgassing rate, paramagnetism, and poor conductivity of heat and electricity. Considering an appropriate cost performance, manufacturers generally use $00Cr_{18}Ni_9Ti$ (SUS304L) austenitic stainless steel with an ultra-low carbon content as a material of the single crystal furnace chamber shell.

With the development of single crystal silicon industry, there are constantly-increasing requirements for mechanical properties such as thermal tolerance and wear resistance of the steel for a single crystal furnace body. Therefore, the $00Cr_{18}Ni_9Ti$ (SUS304L) austenitic stainless steel cannot meet the production requirements. Nickel-based alloy steels with higher corrosion resistance, heat resistance, carbonization resistance, and fatigue resistance, as well as desirable strength and excellent toughness have been tried to prepare single crystal furnaces.

However, currently nickel-based alloy steels need to be further improved in the tensile strength and specified plastic elongation strength

SUMMARY

This section provides a general summary of the disclosure, and is not a comprehensive disclosure of its full scope or all of its features.

In view of this, an objective of the present disclosure is to provide a nickel-based superalloy and a preparation method thereof. The nickel-based superalloy has excellent tensile strength and specified plastic elongation strength.

To achieve the above objective of the present disclosure, the present disclosure provides the following technical solutions.

The present disclosure provides a nickel-based superalloy, including the following components by mass percentage: C: 0.07% to 0.10%, 0<Si≤1.00%, 0<Mn≤1.50%, P≤0.020%, S≤0.005%, Cr: 19.0% to 23.0%, Ni: 31.0% to 34.5%, 0<Cu≤0.75%, Al: 0.15% to 0.60%, Ti: 0.15% to 0.60%, and Fe as a balance.

Preferably, the nickel-based superalloy includes the following components by mass percentage: C: 0.07% to 0.09%, Si: 0.42% to 0.65%, Mn: 1.0% to 1.40%, P≤0.020%, S≤0.005%, Cr: 19% to 23%, Ni: 31.0% to 34%, Cu: 0.02% to 0.25%, Al: 0.20% to 0.30%, Ti: 0.15% to 0.35%, and Fe as the balance.

The present disclosure further provides a preparation method of the nickel-based superalloy, including the following steps:

subjecting an alloy raw material to roughing, refining, degassing in a vacuum oxygen decarburisation converter (VODC), and pouring sequentially to obtain a steel ingot; and annealing the steel ingot to obtain the nickel-based superalloy.

Preferably, the roughing includes electric-arc furnace (EAF) roughing; and the EAF roughing includes melting conducted at 4,800 kV·A to 5,000 kV·A and greater than or equal to 1,620° C., oxidation conducted at 4,500 kV·A to 4,800 kV·A and greater than or equal to 1,650° C., and reduction conducted at 4,500 kV·A to 4,800 kV·A and greater than or equal to 1,650° C.

Preferably, an obtained melting system has less than or equal to 0.004% of P by mass percentage; an obtained oxidation system has less than or equal to 0.15% of C by mass percentage; and an obtained reduction system has 4.8% to 5.2% of slag and less than or equal to 0.005% of S by mass percentage.

Preferably, the refining includes ladle furnace (LF) refining conducted at 2,600 kV·A to 2,800 kV·A and greater than or equal to 1,650° C. for greater than or equal to 30 min under nitrogen blowing at a nitrogen flow rate of 50 L/min to 150 L/min.

Preferably, the degassing in a VODC is conducted at a vacuum degree of less than 1 mbar.

Preferably, an obtained degassing system has less than or equal to 30 ppm of O and less than or equal to 1.5 ppm of H by mass percentage.

Preferably, 15 min to 30 min before the pouring, argon is blown into the degassing system for 2 min to 3 min.

Preferably, the annealing is conducted by heating to 880° C.±10° C. at 50° C./h to 100° C./h and then holding for 8 h to 12 h.

The present disclosure provides a nickel-based superalloy, including the following components by mass percentage: C: 0.07% to 0.10%, 0<Si≤1.00%, 0<Mn≤1.50%, P≤0.020%, S≤0.005%, Cr: 19.0% to 23.0%, Ni: 31.0% to 34.5%, 0<Cu≤0.75%, Al: 0.15% to 0.60%, Ti: 0.15% to 0.60%, and Fe as a balance. In the nickel-based superalloy of the present disclosure, in terms of mass percentage, Ni is adjusted to 31.0% to 34.5%, while P is controlled at less than or equal to 0.020% and S is controlled at less than or equal to 0.005%, thereby improving a tensile strength, a specified plastic elongation strength, a wear resistance, and a high-temperature resistance of the nickel-based superalloy. The data of examples show that the nickel-based superalloy has a tensile strength of greater than or equal to 460 MPa, a specified plastic elongation strength of greater than or equal to 180 MPa, and an elongation at break of greater than or equal to 35%.

The present disclosure further provides a preparation method of the nickel-based superalloy, including the following steps: subjecting an alloy raw material to roughing, refining, degassing in a VODC, and pouring sequentially to obtain a steel ingot; and annealing the steel ingot to obtain the nickel-based superalloy. In the present disclosure, the preparation method strictly control contents of impurity elements P and S in the alloy through roughing, refining, and degassing in a VODC, thereby improving the tensile strength, specified plastic elongation strength, wear resistance, and high-temperature resistance of the nickel-based superalloy.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

The FIGURE shows a schematic diagram of a VODC used in the present disclosure.

Corresponding reference numerals indicate corresponding parts throughout the several views of the drawings.

DETAILED DESCRIPTION

Example embodiments will now be described more fully with reference to the accompanying drawings.

The present disclosure provides a nickel-based superalloy, including the following components by mass percentage:

C: 0.07% to 0.10%, 0<Si≤1.00%, 0<Mn≤1.50%, P≤0.020%, S≤0.005%, Cr: 19.0% to 23.0%, Ni: 31.0% to 34.5%, 0<Cu≤0.75%, Al: 0.15% to 0.60%, Ti: 0.15% to 0.60%, and Fe as a balance.

In the present disclosure, the nickel-based superalloy includes C in a mass percentage of 0.07% to 0.10%, preferably 0.08% to 0.09%. C is a basic element to ensure the strength of corrosion-resistant alloys. C belongs to interstitial elements that are harmful to irradiation, and irradiation hardening is closely related to an amount of the interstitial elements in the steel. An increase of the carbon content leads to an increase of a carbon equivalent (Ceq), resulting in a decrease of the elongation and impact toughness of steels, especially resulting in a greater decrease of low-temperature toughness and a significantly-increased embrittlement transition temperature; and a low Ceq means a desirable steel toughness and a reduced steel strength. Therefore, the C content set at 0.07% to 0.10% ensures excellent comprehensive properties of the nickel-based superalloy.

In the present disclosure, the nickel-based superalloy includes Si in a mass percentage of 0<Si≤1.00%, preferably 0.42% to 0.65%. Si is used as a reducing agent and a deoxidizer in steelmaking. Si is used as a deoxidizer in steel, and is also added as a mixing element generally adjusted in place before tapping. An excessive Si content is harmful to irradiation, and Si is strictly controlled to be less than 1.00% by mass percentage. Preferably, the Si content is controlled at 0.42% to 0.65%, which can prevent Si from reducing the graphitization tendency of carbon in the nickel-based superalloy, and further improve the strength of the nickel-based superalloy in a form of solution strengthening.

In the present disclosure, the nickel-based superalloy includes Mn in a mass percentage of 0<Mn≤1.50%, preferably 1.0% to 1.40%, more preferably 1.1% to 1.3%. Mn is a desirable deoxidizer and desulfurizer, and a mass content of Mn in the nickel-based superalloy is controlled at less than or equal to 1.50% to ensure an effect of deoxidation and desulfurization. Further, the Mn content is designed to be controlled at 1.0% to 1.40%, so as to strengthen a matrix, thereby further improve a hardenability of the nickel-based superalloy and reducing crack sensitivity under a surfacing layer.

In the present disclosure, the nickel-based superalloy includes P in a mass percentage of less than or equal to 0.020%. As a harmful element in steel, P may increase the cold brittleness of steel, deteriorating a welding performance and reducing plasticity. An increase of the weight percentage of P may increase the cold brittleness of the nickel-based superalloy steel, making the welding performance worse, reducing the plasticity, and deteriorating a cold bending performance. The mass percentage of P is controlled at less than or equal to 0.020%, thus ensuring a comprehensive performance of the nickel-based superalloy.

In the present disclosure, the nickel-based superalloy includes S in a mass percentage of less than or equal to 0.005%. S is generally a harmful element in steel, making the steel hot brittle, reducing ductility and toughness of the steel, and causing cracks during forging and rolling; moreover, S is also detrimental to the welding performance and reduces the corrosion resistance. The mass percentage of S is controlled at less than or equal to 0.005%, thereby reducing an influence of S on the corrosion resistance and high-temperature resistance of the nickel-based superalloy.

In the present disclosure, the nickel-based superalloy includes Cr in a mass percentage of 19.0% to 23.0%, preferably 20.0% to 22.0%, and more preferably 21.0%. Cr is a basic element to ensure the corrosion resistance of steel. The oxide film formed by Cr in an oxidizing environment has a high stability. The Cr content is increased when forming an alloy with Ni, showing a desirable corrosion resistance in a medium characterized by oxidation. The mass percentage of Cr is set at 19.00% to 23.00%, which improves the corrosion resistance of the nickel-based superalloy.

In the present disclosure, the nickel-based superalloy includes Ni in a mass percentage of 31.0% to 34.5%, preferably 31.0% to 34%. Ni is a main element to ensure austenitization of the alloy, increase the hardenability, improve the low-temperature toughness, increase an amount of retained austenites, and quench and temper a uniform structure. The mass percentage of Ni is controlled at 31.0% to 34.5%, ensuring the hardenability and high strength of the nickel-based superalloy.

In the present disclosure, the nickel-based superalloy includes Cu in a mass percentage of 0<Cu≤0.75%, preferably 0.02% to 0.25%. Cu can improve an atmospheric corrosion resistance of the steel, improve the strength and a yield ratio of the steel, and has no adverse effect on the weldability.

In the present disclosure, the nickel-based superalloy includes Al in a mass percentage of 0.15% to 0.60%, preferably 0.15% to 0.35%, and more preferably 0.20% to 0.30%. Al can deoxidize and refine grains, and can also form compounds with nickel to improve a thermal strength of nickel-based alloy materials.

In the present disclosure, the nickel-based superalloy includes Ti in a mass percentage of 0.15% to 0.60%, preferably 0.15% to 0.35%, and more preferably 0.2% to 0.35%. The mass percentage of Ti is controlled at 0.15% to 0.60%, which ensures the corrosion resistance of the nickel-based alloy; in addition, Ti enables the nickel-based superalloy to have an excellent weldability.

In the present disclosure, the nickel-based superalloy further includes Fe as a balance.

The present disclosure further provides a preparation method of the nickel-based superalloy, including the following steps:

subjecting an alloy raw material to roughing, refining, degassing in a vacuum oxygen decarburisation converter (VODC), and pouring sequentially to obtain a steel ingot; and annealing the steel ingot to obtain the nickel-based superalloy.

In the present disclosure, the alloy raw material is subjected to roughing, refining, degassing in a VODC, and pouring sequentially to obtain the steel ingot.

In the present disclosure, the roughing includes preferably EAF roughing; and the EAF roughing includes preferably melting, oxidation, and reduction in sequence.

In the present disclosure, the melting is conducted at preferably 4,800 kV·A to 5,000 kV·A, more preferably 4,900 kV·A and preferably greater than or equal to 1,620° C., more preferably 1,620° C. to 1,700° C. An obtained melting system has less than or equal to 0.004% of P by mass percentage. There is no special limitation on a melting time, as long as the melting system has less than or equal to 0.004% of P by mass percentage. The melting can remove phosphorus.

In the present disclosure, the oxidation is conducted at preferably 4,500 kV·A to 4,800 kV·A, more preferably 4,600 kV·A to 4,700 kV·A and preferably greater than or equal to 1,650° C., more preferably 1,680° C. to 1,730° C. An obtained oxidation system has preferably less than or equal to 0.15% of C by mass percentage. There is no special limitation on a holding time for the oxidation, as long as the oxidation system has preferably less than or equal to 0.15% of C by mass percentage. The oxidation enables decarburization, slag skimming to remove harmful elements "P and S", and preliminary deoxidation.

In the present disclosure, the reduction is conducted at preferably 4,500 kV·A to 4,800 kV·A, more preferably 4,600 kV·A to 4,700 kV·A and preferably greater than or equal to 1,650° C., more preferably 1,680° C. to 1,730° C. An obtained reduction system has preferably 4.8% to 5.2% of slag and preferably less than or equal to 0.005% of S by mass percentage. There is no special limitation on a holding time for the reduction, as long as the reduction system has preferably 4.8% to 5.2% of slag and preferably less than or equal to 0.005% of S by mass percentage. The reduction can adjust a chemical composition and the slag, and conduct diffusion deoxidation.

In the present disclosure, the EAF roughing is conducted preferably in a 25 t EAF. The 25 t EAF includes a furnace body, a furnace bottom, and a furnace wall; the furnace body includes a furnace lid, a furnace door, a tapping groove, and a furnace stack; and the furnace bottom and the furnace wall each are preferably built of a refractory material. The 25 t EAF uses preferably three-phase alternating current as a power source.

In the present disclosure, after the roughing, an obtained roughing system is subjected to a component analysis by preferably a German OBLFQSN750 direct-reading spectrometer or a DV-4-type 26-element and 30-channel direct-reading spectrometer from Baird Corporation of the United States.

In the present disclosure, the refining includes preferably LF refining conducted at preferably 2,600 kV·A to 2,800 kV·A, more preferably 2,700 kV·A and preferably greater than or equal to 1,650° C., more preferably 1680° C. to 1730° C. for preferably greater than or equal to 30 min, more preferably 35 min to 38 min under nitrogen blowing at a nitrogen flow rate of preferably 50 L/min to 150 L/min, more preferably 100 L/min.

In the present disclosure, the LF refining is conducted preferably in an LF; and the LF preferably includes a silo, a weighing and feeding device, a wire feeder, a ladle car, an electrode lifting system, and a ladle cover, as well as a lifting system, a transformer, a hydraulic station, and a bottom argon-blowing system thereof.

In the present disclosure, during the LF refining, a molten steel is statically boiled by blowing argon at the bottom and heating by an electric arc, and impurities in the molten steel float up to form a slag layer, thereby purifying the molten steel, reducing a solubility of oxygen and hydrogen, and conducting desulfurization and decarburization to remove non-metallic inclusions.

In the present disclosure, after the refining, an obtained refining system is preferably subjected to a component analysis by preferably the same equipment as the above technical solution, which is not repeated here.

In the present disclosure, the degassing preferably in a VODC is conducted at a vacuum degree of less than 1 mbar. The VODC includes preferably 4 major parts: a converter, a dust collector, a Roots vacuum pump group, and a measurement and control instrument. The FIGURE shows a schematic diagram of a structure of the VODC.

In the present disclosure, an obtained degassing system has preferably less than or equal to 30 ppm of O and preferably less than or equal to 1.5 ppm of H by mass percentage.

In the present disclosure, 15 min to 30 min before the pouring, argon is preferably blown into the degassing system for 2 min to 3 min; the argon blowing before the pouring can drive out air in the mold to prevent secondary oxidation. The pouring is conducted preferably under argon protection; the pouring under the argon protection can reduce an influence of the outside air on the molten steel.

In the present disclosure, parameters of the roughing, refining, degassing in a VODC, and pouring are strictly controlled during the preparation, such that the nickel-based superalloy has low contents of P and S, thereby improving the high-temperature resistance and wear resistance of the nickel-based superalloy.

In the present disclosure, the steel ingot is annealed to obtain the nickel-based superalloy.

In the present disclosure, the annealing is conducted by heating to preferably 880° C.±10° C. at preferably 50° C./h to 100° C./h, more preferably 80° C./h and then holding for preferably 8 h to 12 h.

The annealing is conducted preferably in a heating furnace; and the steel ingot is at preferably less than or equal to 150° C. when entering the heating furnace. In the present disclosure, after the annealing, an annealed product is preferably cooled by preferably furnace cooling to preferably less than or equal to 500° C.

The nickel-based superalloy and the preparation method thereof provided by the present disclosure are described in detail below in conjunction with the examples, but these examples should not be construed as limiting the protection scope of the present disclosure.

Example 1

Raw materials were weighed according to the following proportions: C: 0.07%, Si: 0.6%, Mn: 1.15%, P: 0.05%, S: 0.01%, Cr: 20.0%, Ni: 31.0%, Cu: 0.25%, Al: 0.22%, Ti: 0.25%, and Fe as a balance.

A preparation method included the following steps:

The alloy raw materials were weighed according to the above components, and placed in an EAF to conduct EAF roughing; where melting was conducted at 4,800 kV·A and 1,620° C., until an obtained melting system had a mass content of P at less than or equal to 0.004%; oxidation was conducted at 4,500 kV·A and 1,650° C., until an obtained oxidation system had a mass content of C at less than or equal to 0.15%; reduction was conducted at 4,500 kV·A and 1,650° C., until an obtained reduction system had about 5% of slag (FeO) and a mass content of S at less than or equal to 0.005%; LF refining was conducted in an LF at 2,800 kV·A and 1,650° C. for 30 min under nitrogen blowing at a nitrogen flow rate of 100 L/min; degassing in a VODC was conducted at a vacuum degree of less than 1 mbar, until an obtained degassing system had a mass percentage of O at less than or equal to 30 ppm and a mass percentage of H at less than or equal to 1.5 ppm; argon was blown into the degassing system for 3 min, and pouring was conducted under argon protection to obtain a steel ingot.

The steel ingot was cooled to 140° C., and annealed in a heating furnace by heating to 880° C.±10° C. at 80° C./h and then holding for 10 h, and subjected to furnace cooling to 550° C. to obtain a nickel-based superalloy.

Example 2

Raw materials were weighed according to the following proportions: C: 0.07%, Si: 0.42%, Mn: 1.0%, P: 0.06%, S: 0.02%, Cr: 19.0%, Ni: 32%, Cu: 0.15%, Al: 0.25%, Ti: 0.28%, and Fe as a balance.

A preparation method was the same as that in Example 1.

Example 3

Raw materials were weighed according to the following proportions: C: 0.09%, Si: 0.55%, Mn: 1.20%, P: 0.05%, S: 0.01%, Cr: 22.0%, Ni: 33.0%, Cu: 0.12%, Al: 0.28%, Ti: 0.15%, and Fe as a balance.

A preparation method was the same as that in Example 1.

Example 4

Raw materials were weighed according to the following proportions: C: 0.08%, Si: 0.45%, Mn: 1.4%, P: 0.04%, S: 0.01%, Cr: 23.0%, Ni: 34.0%, Cu: 0.18%, Al: 0.23%, Ti: 0.23%, and Fe as a balance.

A preparation method was the same as that in Example 1.

Example 5

Raw materials were weighed according to the following proportions: C: 0.09%, Si: 0.65%, Mn: 1.25%, P: 0.04%, S: 0.01%, Cr: 21.0%, Ni: 33.5%, Cu: 0.02%, Al: 0.25%, Ti: 0.27%, and Fe as a balance.

A preparation method was the same as that in Example 1.

Comparative Example 1

This comparative example differed from Example 1 in that: the degassing in VODC was conducted on a vacuum oxygen decarburization (VOD) furnace and an argon oxygen decarburization (AOD) furnace.

The VOD has smelting functions including ultra-low decarburization and denitrification of stainless steel material: and the AOD has functions including decarburization, desulfurization, dehydrogenation, and inclusion removal. The smelting operations of the VOD/AOD have fixed equipment. During the smelting, the uniformity of molten steel is limited in the VOD/AOD; while for the VODC, equipment is always rotating. Therefore, whether for decarburization, desulfurization, dephosphorization, or degassing, the VODC has comprehensive functions that exceed the combination of VOD/AOD, and can provide a high-quality molten steel with lower phosphorus, sulfur and inclusion indexes.

The elemental compositions in the nickel-based superalloys of Examples 1 to 5 and Comparative Example 1 were analyzed on a German OBLFQSN750 direct-reading spectrometer, and the results were shown in Table 1.

TABLE 1

Composition of nickel-based superalloys obtained in Examples 1 to 5 and Comparative Example 1.

| SN | Chemical composition (Wt %) | | | | | | | | | | |
|---|---|---|---|---|---|---|---|---|---|---|---|
|  | C | Si | Mn | P | S | Cr | Ni | Cu | Al | Ti | Fe |
| Example 1 | 0.07 | 0.6 | 1.15 | 0.010 | 0.0015 | 20 | 31 | 0.25 | 0.22 | 0.25 | the balance |
| Example 2 | 0.07 | 0.42 | 1.0 | 0.010 | 0.003 | 19 | 32 | 0.15 | 0.25 | 0.28 | the balance |
| Example 3 | 0.09 | 0.55 | 1.20 | 0.012 | 0.002 | 22 | 33 | 0.12 | 0.28 | 0.15. | the balance |
| Example 4 | 0.08 | 0.45 | 1.4 | 0.010 | 0.003 | 23 | 34 | 0.18 | 0.23 | 0.23 | the balance |
| Example 5 | 0.09 | 0.65 | 1.25 | 0.008 | 0.003 | 21 | 33.5 | 0.02 | 0.25 | 0.27 | the balance |
| Comparative Example 1 | 0.07 | 0.6 | 1.15 | 0.018 | 0.004 | 20 | 31 | 0.25 | 0.22 | 0.25 | the balance |

The performances of the nickel-based superalloys obtained in Examples 1 to 5 and Comparative Example 1 were tested, and the results were shown in Table 2.

TABLE 2

Performance test results of nickel-based superalloys obtained in Examples 1 to 5 and Comparative Example 1.

| SN | Tensile strength Rm (MPa) | Specified plastic elongation strength $R_{P0.2}$ (MPa) | Elongation at break A (%) | Wear resistance |
|---|---|---|---|---|
| Test method | GB/T228.1-2016 | GB/T228.1-2016 | GB/T228.1-2016 | GB/T12444-2006 |
| Example 1 | 545 | 285.75 | 46.5 | √ |
| Example 2 | 523 | 273 | 45.0 | √ |
| Example 3 | 542 | 290 | 43.0 | √ |
| Example 4 | 566 | 297 | 45.5 | √ |
| Example 5 | 552 | 283 | 44.5 | √ |
| Comparative Example 1 | 498 | 252 | 42.5 | √ |

The above descriptions are merely preferred implementations of the present disclosure. It should be noted that a person of ordinary skill in the art may further make several improvements and modifications without departing from the principle of the present disclosure, but such improvements and modifications should be deemed as falling within the protection scope of the present disclosure The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A preparation method of a nickel-based superalloy, the nickel-based superalloy comprising the following components by mass percentage:
C: 0.07% to 0.10%, 0<Si≤1.00%, 0<Mn≤1.50%, P≤0.020%, S≤0.005%, Cr: 19.0% to 23.0%, Ni: 31.0% to 34.5%, 0<Cu≤0.75%, Al: 0.15% to 0.60%, Ti: 0.15% to 0.60%, and Fe as a balance;
the preparation method comprising the following steps:
subjecting an alloy raw material to roughing, refining, degassing in a vacuum oxygen decarburisation converter (VODC), and pouring sequentially to obtain a steel ingot; and
annealing the steel ingot to obtain the nickel-based superalloy;
wherein the roughing comprises electric-arc furnace (EAF) roughing; and
wherein the EAF roughing comprises melting conducted at 4,800 kV·A to 5,000 kV·A and greater than or equal to 1,620° C., oxidation conducted at 4,500 kV·A to 4,800 kV·A and greater than or equal to 1,650° C., and reduction conducted at 4,500 kV·A to 4,800 kV·A and greater than or equal to 1,650° C.

2. The preparation method according to claim 1, wherein an obtained melting system has less than or equal to 0.004% of P by mass percentage; an obtained oxidation system has less than or equal to 0.15% of C by mass percentage; and an obtained reduction system has 4.8% to 5.2% of slag and less than or equal to 0.005% of S by mass percentage.

3. The preparation method according to claim 1, wherein the refining comprises ladle furnace (LF) refining conducted at 2,600 kV·A to 2,800 kV·A and greater than or equal to 1,650° C. for greater than or equal to 30 min under nitrogen blowing at a nitrogen flow rate of 50 L/min to 150 L/min.

4. The preparation method according to claim 1, wherein the degassing in a VODC is conducted at a vacuum degree of less than 1 mbar.

5. The preparation method according to claim 4, wherein an obtained degassing system has less than or equal to 30 ppm of O and less than or equal to 1.5 ppm of H by mass percentage.

6. The preparation method according to claim 1, wherein 15 min to 30 min before the pouring, argon is blown into the degassing system for 2 min to 3 min.

7. The preparation method according to claim 1, wherein the annealing is conducted by heating to 880° C.±10° C. at 50° C./h to 100° C./h and then holding for 8 h to 12 h.

8. A preparation method of a nickel-based superalloy, wherein the nickel-based superalloy comprises the following components by mass percentage:
C: 0.07% to 0.09%, Si: 0.42% to 0.65%, Mn: 1.0% to 1.40%, P≤0.020%, S≤0.005%, Cr: 19% to 23%, Ni: 31.0% to 34%, Cu: 0.02% to 0.25%, Al: 0.20% to 0.30%, Ti: 0.15% to 0.35%, and Fe as the balance;
the preparation method comprising the following steps:
subjecting an alloy raw material to roughing, refining, degassing in a vacuum oxygen decarburisation converter (VODC), and pouring sequentially to obtain a steel ingot; and
annealing the steel ingot to obtain the nickel-based superalloy;
wherein the roughing comprises electric-arc furnace (EAF) roughing; and
wherein the EAF roughing comprises melting conducted at 4,800 kV·A to 5,000 kV·A and greater than or equal to 1,620° C., oxidation conducted at 4,500 kV·A to 4,800 kV·A and greater than or equal to 1,650° C., and reduction conducted at 4,500 kV·A to 4,800 kV·A and greater than or equal to 1,650° C.

9. The preparation method according to claim 8, wherein an obtained melting system has less than or equal to 0.004% of P by mass percentage; an obtained oxidation system has less than or equal to 0.15% of C by mass percentage; and an obtained reduction system has 4.8% to 5.2% of slag and less than or equal to 0.005% of S by mass percentage.

10. The preparation method according to claim 8, wherein the refining comprises ladle furnace (LF) refining conducted at 2,600 kV·A to 2,800 kV·A and greater than or equal to 1,650° C. for greater than or equal to 30 min under nitrogen blowing at a nitrogen flow rate of 50 L/min to 150 L/min.

11. The preparation method according to claim 8, wherein the degassing in a VODC is conducted at a vacuum degree of less than 1 mbar.

12. The preparation method according to claim 11, wherein an obtained degassing system has less than or equal to 30 ppm of O and less than or equal to 1.5 ppm of H by mass percentage.

13. The preparation method according to claim 8, wherein 15 min to 30 min before the pouring, argon is blown into the degassing system for 2 min to 3 min.

14. The preparation method according to claim 8, wherein the annealing is conducted by heating to 880° C.±10° C. at 50° C./h to 100° C./h and then holding for 8 h to 12 h.

* * * * *